United States Patent
Manuel-Devadoss (10) Patent No.: US 10,229,320 B1
(45) Date of Patent: Mar. 12, 2019

(54) METHOD AND SYSTEM TO PROVIDE THE DETAILS ABOUT THE PRODUCT ITEM THAT THE USER IS LOOKING FOR AND PROVIDING THE NAVIGATION MAP FOR THE SELECTED ITEM PRESENTED IN THE STORE

(71) Applicant: Johnson Manuel-Devadoss, Pearland, TX (US)

(72) Inventor: Johnson Manuel-Devadoss, Pearland, TX (US)

(73) Assignee: JOHNSON MANUEL-DEVADOSS, Houston, TX (US)

( * ) Notice: Subject to any disclaimer, the term of this patent is extended or adjusted under 35 U.S.C. 154(b) by 0 days.

(21) Appl. No.: 15/681,378

(22) Filed: Aug. 19, 2017

(51) Int. Cl.
   *G06K 9/00* (2006.01)
   *G01C 21/34* (2006.01)
   *G06Q 30/06* (2012.01)

(52) U.S. Cl.
   CPC ..... *G06K 9/00671* (2013.01); *G01C 21/3476* (2013.01); *G06Q 30/0639* (2013.01)

(58) Field of Classification Search
   CPC .......... G06Q 30/0641; G06Q 30/0623; G06Q 30/02; G06Q 30/0643; G06F 17/30876
   USPC ........ 382/103; 705/14.33, 22; 709/223, 238, 709/245, 217, 219, 200; 715/739, 838; 707/E17.11
   See application file for complete search history.

(56) References Cited

U.S. PATENT DOCUMENTS

| | | | |
|---|---|---|---|
| 7,225,144 B2 * | 5/2007 | Hashimoto | G06F 17/3087 705/22 |
| 9,904,849 B2 * | 2/2018 | Estrada | G06N 3/04 |
| 2005/0198095 A1 * | 9/2005 | Du | G06Q 10/087 709/200 |
| 2018/0040037 A1 * | 2/2018 | Blair, II | H04W 4/029 |

* cited by examiner

*Primary Examiner* — Charlotte M Baker (57) ABSTRACT

Disclosed is a method and system to provide the details about an item and in-store navigation to the item. A user may leverage the present invention to capture an image using camera device to analyze and determine more details about it. The present invention may leverage the deep learning techniques to analyze the given image to determine a plurality of items presented in the image. In one embodiment, the present invention highlights a plurality of items from the image to allow user to select an item. Once user chosen an item from the highlighted objected from the image, the present invention provides more detailed information about the item along with related items to the chosen item and provides a list of stores that may have the item. In another embodiment, the present invention provides the in-store navigation to the chosen item presented in the chosen store.

12 Claims, 6 Drawing Sheets

METHOD AND SYSTEM TO PROVIDE THE DETAILS ABOUT THE PRODUCT ITEM THAT THE USER IS LOOKING FOR AND PROVIDING THE NAVIGATION MAP FOR THE SELECTED ITEM PRESENTED IN THE STORE

CROSS-REFERENCE TO RELATED APPLICATIONS

This application claims the benefit of U.S. Provisional Application No. 62/377,165, filed on Aug. 19, 2016, and incorporated by reference herein in its entirety.

BACKGROUND OF THE INVENTION

1. Field of the Invention

The present invention relates generally to analyze the image to determine the characteristics of a plurality of objects presented in the image, and particularly to highlight a plurality of objects presented in the image and allow user to choose an item from highlighted objects in the image and to provide details about the chosen item and provide an in-store navigation to the chosen item in the selected store.

2. Description of Related Art

It is hard to find what the object in a particular site is and finding the information about that product and where we can get the related products from the local stores and where it is resides in the local store are the cumbersome and tiring jobs. There is a need for method and system to provide quick way of attaining the product what user is looking for.

Although there are couple of mobile apps available in the market that allows consumers to snap photos of items found in circulars, print ads, and catalogs in order to purchase directly from their smartphones but these apps are not providing the detailed information about where the item located in the user selected store. Philips connected retail lighting system provides the item navigation inside the retail but it does not allow users to shop by taking photos and providing list of objects identified in the taken photo and allow users to select which object to get know more details about and provide the list of retails stores that may contain the selected object.

Hence, there is no method or system that provide the sole or combination of allow users to take picture of what they would like to know and identify the list of objects in the taken picture and provide the list of identified objects to the users to let them choose which object from the taken picture to get know more of that and where they can get the item from and provide the navigation of the item in the selected retail store.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

SUMMARY

The present invention allows consumers to capture the image of item found in anywhere in order to get to know more details of the item that presented in the image and where they can get it from. In one embodiment, the present invention may analyze all possible objects or items presented in the captured picture and highlights a plurality of objects presented in the image and allow him/her to select the object to know more details about.

In another embodiment, the present invention provides the details about all possible discovered items from the picture along with related objects to each item presented in the picture and provides the detailed information about the product for the chosen item from the picture. In another embodiment, the present invention provides a list of stores that are presented in the closed proximity of user for the chosen item and provide the detailed in-store navigation map to the location of the item presented in the chosen local store.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following is a detailed description of implementations consistent with the principles of the invention along with accompanying drawings indicated above. The same reference numbers in different drawings may identify the same or similar elements. In addition, the following detailed description does not limit the invention.

Implementation consistent with the principles of the invention is directed to analyzing the given image to determine a plurality of objects presented in the image and highlighting the identified plurality of objects/items and allowing user to choose an item from highlighted objects and providing the details about the chosen object and providing a plurality of stores based on his/her zip code that may have the chosen item and providing the in-store navigation map to the chosen item in the chosen store.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
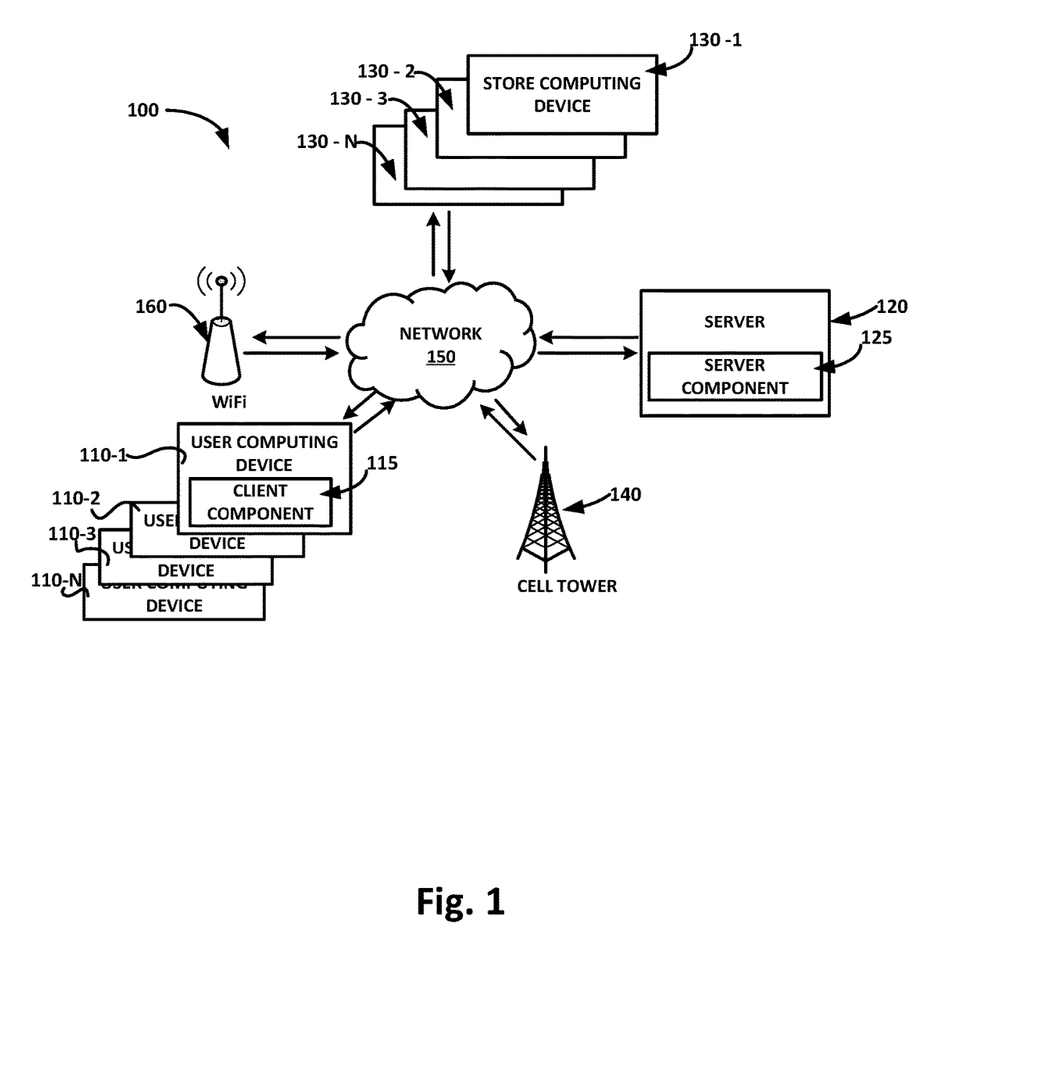
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 150 may include multiple clients 110 connected to server 120, store computing server 130-1 . . . , 130-N via a network 150, Wifi 160 and Cell Tower 140. Clients 110, server 120, N store computing server 130 have been illustrated as connected to network 150 for simplicity. In practice, there may be more or fewer clients and servers. Also, in some instances, a client may perform a function of a server and a server may perform a function of a client.

Clients 110 may include client entities. An entity may be defined as a mobile device, such as a personal digital assistant (PDA), a tablet, an iPad, an iPhone, an Android mobile device, Blackberry, or another type of computation or communication device, a thread or process running on one of these devices, and/or an object executable by one of these devices. Servers 120, 130 may include server entities that provide users to analyze a plurality of objects from the captured image and highlights a plurality of objects to allow them to choose their preferred object and provide in-store navigation to the chosen object. In an implementation consistent with the principles of the invention, client device 110 may include a computer implemented program (hereafter called "Client Component" 115) to capture the image and establishing communication with server component to highlight a plurality of objects from the image, and provide in-store navigation to the chosen object.

In an implementation consistent with the principles of the invention, server 120, 130 may include a computer implemented program (hereafter called "Server Component") 125, 135 respectively. The server component 125 to analyze the captured image by client component 115 to determine a plurality of objects from it and highlight the determined a plurality of objects and communicate to the chosen store server component 135 to retrieve the in-store layout to determine the location of user chosen object and plot the in-store navigation to the location of user chosen object in the chosen store layout.

Network 150 may include a local area network (LAN), a wide area network (WAN), a telephone network, such as the Public Switched Telephone Network (PSTN), an intranet, the Internet, a memory device, or a combination of networks. Clients 110 and servers 120, 130 may connect to network 150 via wired, wireless, and/or optical connections.

Figure 2A:
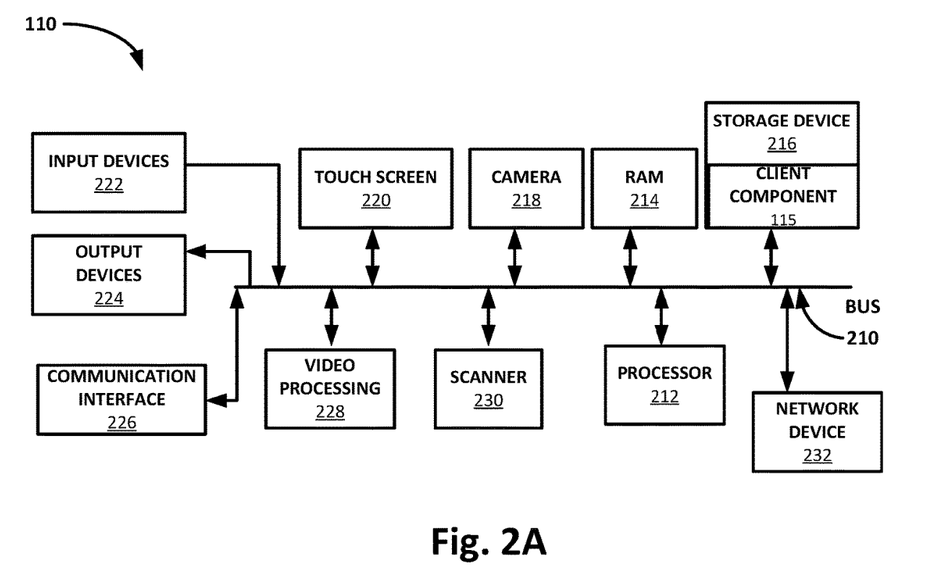
FIG. 2 is an exemplary diagram of a client and/or server of FIG. 1 according to an implementation consistent with the principles of the invention.
Figure 2B:
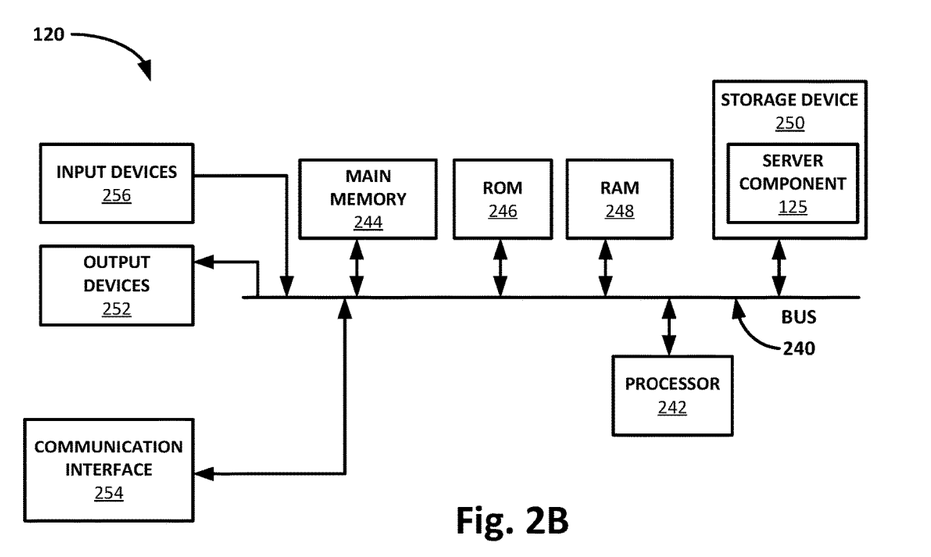

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As it will be described in detail below, the client/server entity, consistent with the principles of the invention, perform certain searching, generating user notification with their activities, updating the user activities to their subscribed social media websites related operations. The client/server entity may perform these operations in responses to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
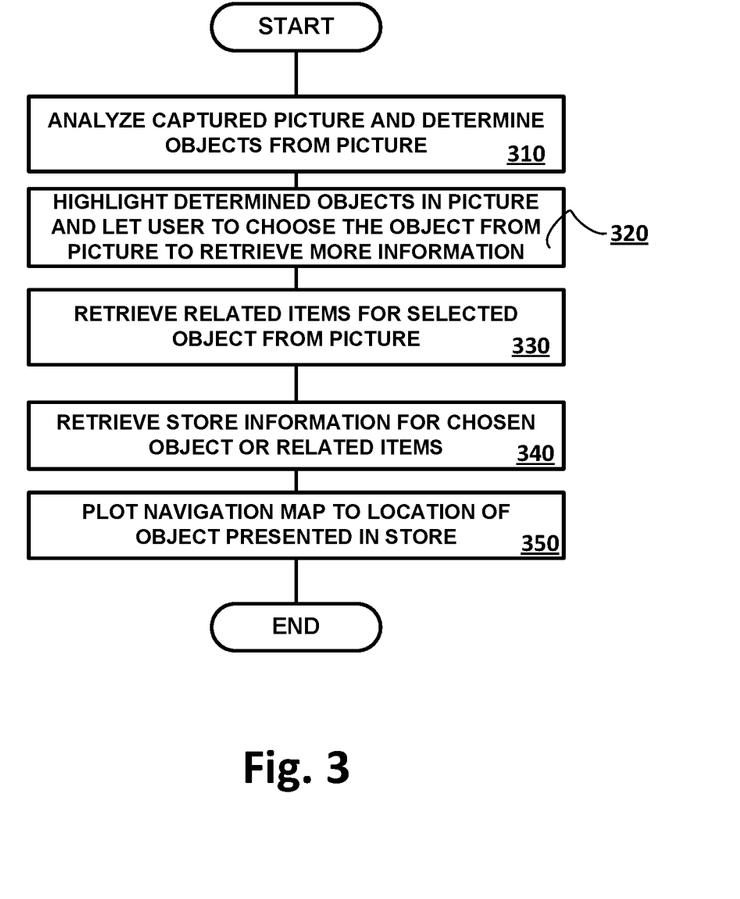
FIG. 3 is a flowchart of operational sequences of the implementation of present invention of FIG. 1 according to an implementation consistent with the principles of the invention.

FIG. 3 is a flowchart of operational sequences of the implementation of present invention of FIG. 1 according to an implementation consistent with the principles of the invention. Referring to FIG. 3, the operational sequences comprises the following steps:

In Step 310, user may use their computing device such as mobile or portable media device to take the picture of the object or item he/she is looking to find more information about. The present invention is a computer readable medium that can be installed in user computing device. When user opens the present invention computer readable medium, the present invention initiates the user computing device camera module. In some scenario, user may use the present invention to capture the image. In another scenario, user may take a picture using their computing device and upload it to the present invention to analyze.

In Step 320, the captured image may analyze by present invention. The present invention may use the deep learning convolutional neural network to analyze the image to retrieve a plurality of objects. One of the industry example framework is OpenCV with applying filters for multiple object tracking. The present invention leverages a new algorithm to retrieve the multiple objects detection. There are a couple of algorithms such as BoundingBoxOverlapRatio, Hungarian exists in the industry to identify the multiple objects. However, these algorithms may not suitable for tracking the tiny object that presented in the captured image.

The present invention multiple object tracking algorithm scans the image and identify the picture is being processed by analyzing it and extracting the objects presented in the picture. Extracting involves the image segmentation which is finding and identifying the big chunk of objects/items from the large picture and retrieving the detailed individual child items from the big chunk of object that presented in the picture. The extraction is to simplify and/or change the representation of an image into something that is more meaningful and easier to analyze. The extraction is typically used to locate objects and boundaries (lines, curves, etc.) in the picture. More precisely, it is the process of assigning a label to every pixel in the picture such that pixels with the same label share certain characteristics.

In step 320, the present invention may find and retrieve the possible related objects/items by matching the pattern of individual objects/items with source of image pattern repository. The source of image pattern repository is a large collection of images objects that are retrieved from the various sources through internet. The repository contains the image objects along with the detailed information about the image object.

In step 330, user selects the object/item from either the highlighted in the picture or from the related objects/items for the highlighted object/item in the picture. The present invention retrieves the detailed information about the object/item for the user's chosen object/item and displays them into the screen. In step 340, retrieves the local stores that may have the object/item chosen by user based on their location attributes such as either zip code or latitude/longitude. Once user choses the store from the list of local stores presented to them, present invention retrieves the location of the object/item presented in the selected store from the store computing device. Finally, the present invention plots the navigation map using retrieved object/item location attributes from the store computing device as shown in step 350.

Figure 4A:
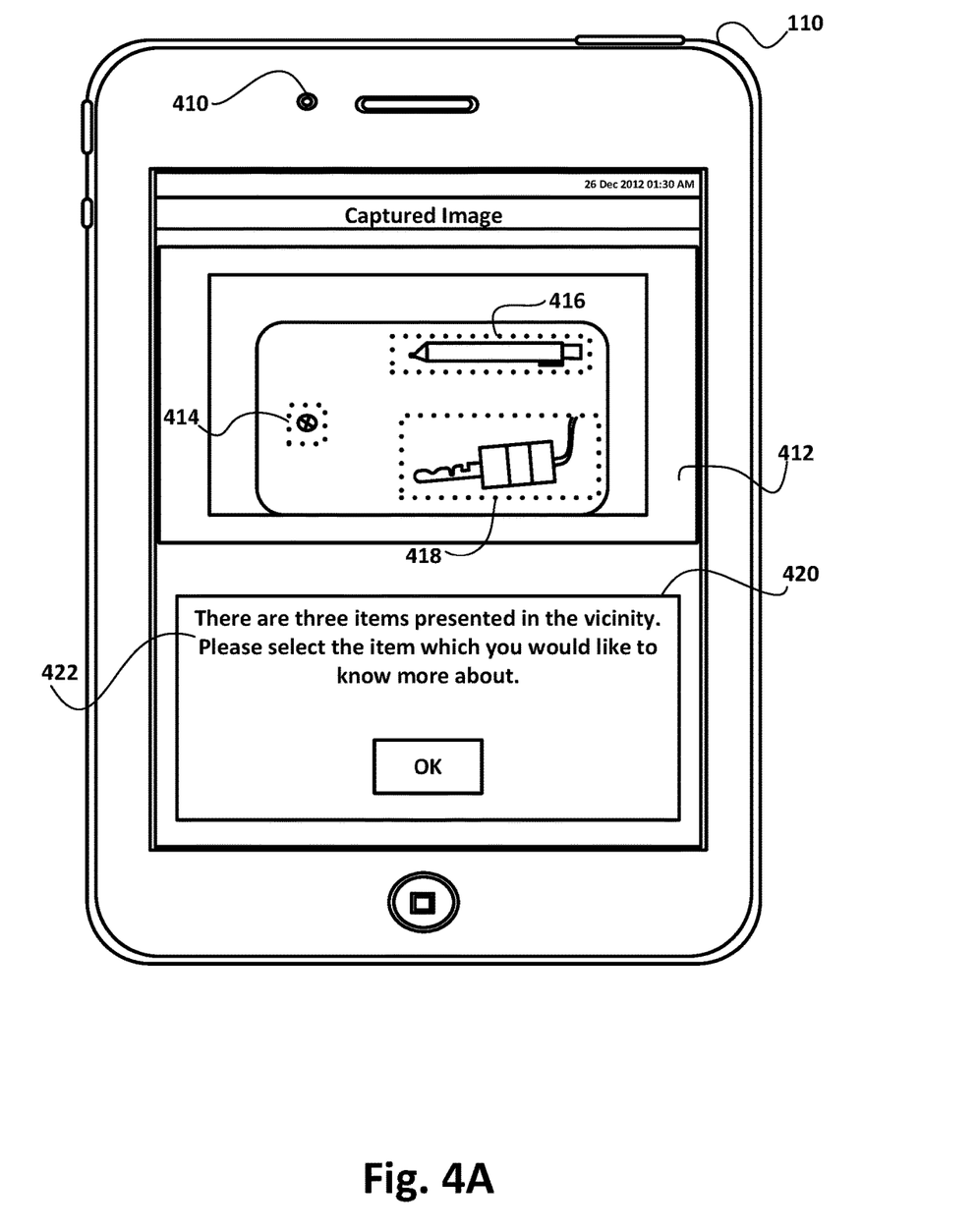
FIG. 4A is an exemplary example of capturing the images according to an implementation consistent with the principles of the invention.

FIG. 4A is an exemplary example of capturing the images according to an implementation consistent with the principles of the invention. User may open the present invention to capture the image from his/her eye vicinity. The present invention leverages the mobile computing camera device 410 to capture a plurality of objects such as pen 416, screw 414, and key 418 in the mobile computing camera 410 vicinity. Then the present invention uses the deep learning techniques such as multiple object detection to identify the objects and highlights in the captured image area section to allow user to choose which object he/she would like to get to know more as depicts in the 420, 422.

Figure 4B:
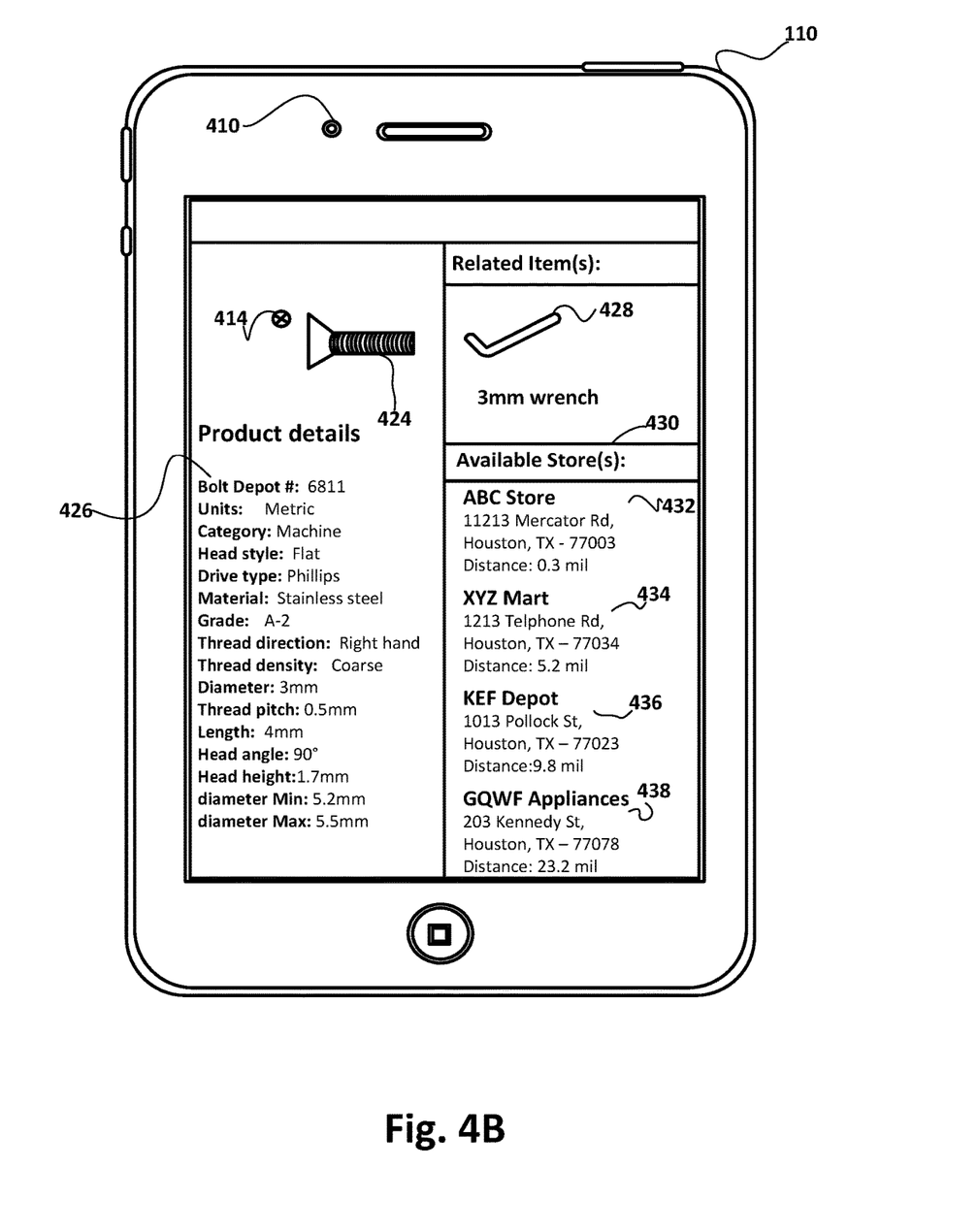
FIG. 4B is an exemplary example of providing details about selected object according to an implementation consistent with the principles of the invention.

FIG. 4B is an exemplary example of providing details about selected object according to an implementation consistent with the principles of the invention. As shown in FIG. 4B, user chosen a screw 414 from the highlighted objects that presented in the captured image section in FIG. 4A. The present invention retrieves the detailed information from images repository and presented in the product details section. Similarly, it may retrieve related items that are similar to screw 414 and displayed in the related items section. Also, it retrieves available stores that may present the chosen item based on the user zip code. Typically, present invention communicates to each stores computing system using store API and searches against each store computing device to see the chosen item is available in the store and display the details accordingly.

Figure 4C:
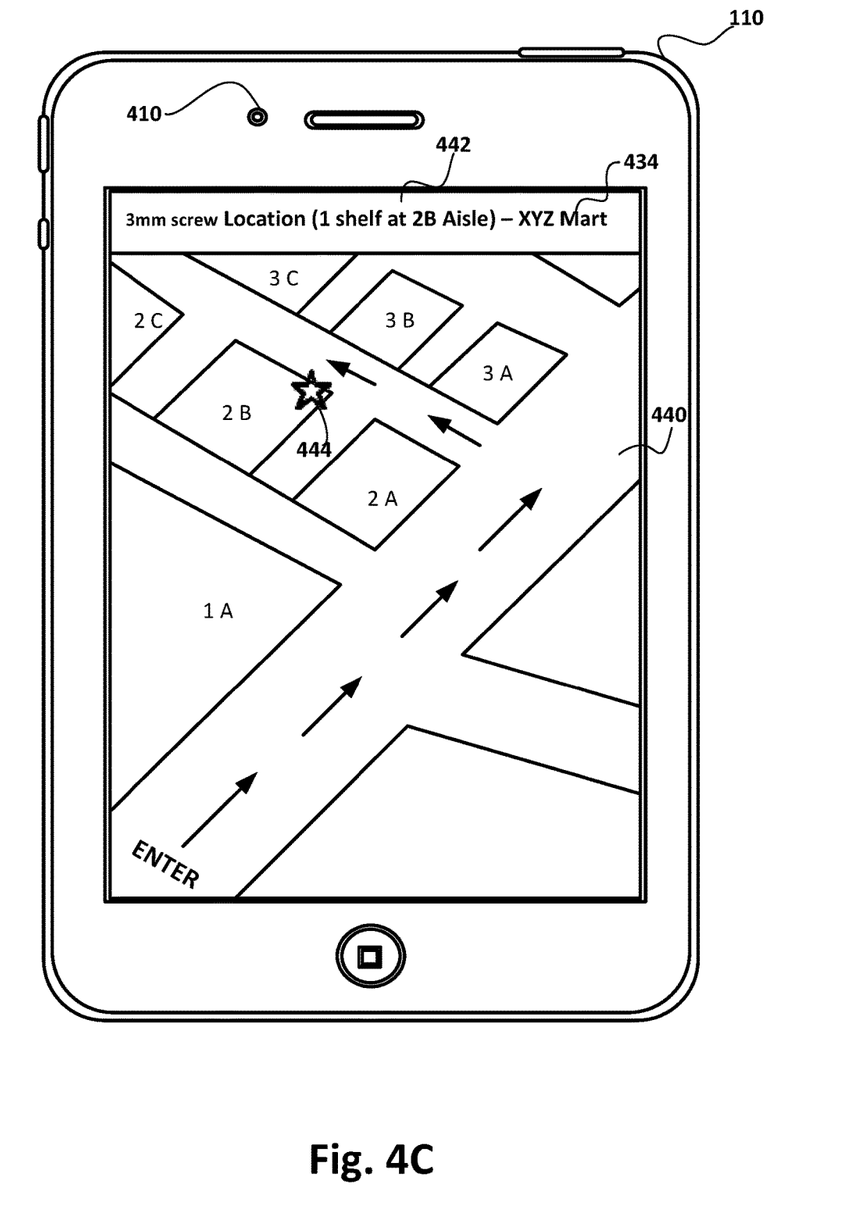
FIG. 4C is an exemplary example of showing navigation to the item in the store according to an implementation consistent with the principles of the invention.

FIG. 4C is an exemplary example of showing navigation to the item in the store according to an implementation consistent with the principles of the invention. Once user selected the store 434, the present invention plots the navigation map 440 to the item location 442 in the store when user enters into the selected store 434. In current world, most of the retail stores are implementing the Lifi to provide the stream line access to each store layout and where the items are located to the customer. In one of the embodiment, the present invention may leverage the Lifi to retrieve the store layout and items location details from the store computing device. Also, there are a couple of instore navigation API such as google instore API may use to plot the navigation map 440 to the selected item location 442 in the selected store 434.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "provisioning" or "processing" or "allowing" or "configuring" or "generating" or "obtaining" or "determining" or "retrieving" or "providing" or "establishing" or "converting" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. The present invention also relates to an apparatus for performing the operations herein. This apparatus may be specially constructed for the required purposes, or it may comprise a general-purpose computer selectively activated or reconfigured by a computer program stored in the computer. Such a computer program component may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
    analyzing a mobile computing captured image to identify a plurality of objects presented;
    highlighting a plurality of identified objects from mobile computing captured image for user to choose a particular object;
    retrieving a plurality of information for user chosen object from highlighted plurality of objects;
    providing a plurality of stores for user chosen object from highlighted plurality of objects;
    providing an in-store navigation map to a chosen object from a plurality of identified objects.

2. The method of claim 1, wherein identified a plurality of objects is plurality of object detection using deep learning technique from provided captured image by user.

3. The method of claim 1, wherein chosen object is an object selected by user from a highlighted plurality of objects in captured image to determine object features and where to buy.

4. The method of claim 1, wherein in-store navigation map is providing a navigational route to a chosen object that is presented in chosen store.

5. A system, comprising:
    a processor; and
    a memory coupled with the processor, wherein the memory is configured to provide the processor with instructions which when executed cause the processor to:
    analyzing a mobile computing captured image to identify a plurality of objects presented;
    highlighting a plurality of identified objects from mobile computing captured image for user to choose a particular object;
    retrieving a plurality of information for user chosen object from highlighted plurality of objects;
    providing a plurality of stores for user chosen object from highlighted plurality of objects;
    providing an in-store navigation map to a chosen object from a plurality of identified objects.

6. The system of claim 5, wherein identified a plurality of objects is plurality of object detection using deep learning technique from provided captured image by user.

7. The system of claim 5, wherein chosen object is an object selected by user from a highlighted plurality of objects in captured image to determine object features and where to buy.

8. The system of claim 5, wherein in-store navigation map is providing a navigational route to a chosen object that is presented in chosen store.

9. A computer program product, the computer program product being embodied in a tangible non-transitory computer readable storage medium and comprising computer instructions for:
    analyzing a mobile computing captured image to identify a plurality of objects presented;
    highlighting a plurality of identified objects from mobile computing captured image for user to choose a particular object;
    retrieving a plurality of information for user chosen object from highlighted plurality of objects;
    providing a plurality of stores for user chosen object from highlighted plurality of objects;
    providing an in-store navigation map to a chosen object from a plurality of identified objects.

10. The computer program product of claim 9, wherein identified a plurality of objects is plurality of object detection using deep learning technique from provided captured image by user.

11. The computer program product of claim 9, wherein chosen object is an object selected by user from a highlighted plurality of objects in captured image to determine object features and where to buy.

12. The computer program product of claim 9, wherein in-store navigation map is providing a navigational route to a chosen object that is presented in chosen store.

* * * * *